(12) United States Patent
Kuno et al.

(10) Patent No.: US 7,950,714 B2
(45) Date of Patent: May 31, 2011

(54) VEHICLE SEAT

(75) Inventors: Satoru Kuno, Aichi-ken (JP);
Tsunetoshi Hattori, Nagoya (JP);
Noriko Chiba, Toyota (JP); Takayuki Kumamoto, Toyota (JP); Hideyuki Matsuo, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 201 days.

(21) Appl. No.: 12/479,992

(22) Filed: Jun. 8, 2009

(65) Prior Publication Data
US 2009/0302632 A1    Dec. 10, 2009

(30) Foreign Application Priority Data

Jun. 9, 2008  (JP) ................................. 2008-150220

(51) Int. Cl.
*B60N 2/02* (2006.01)

(52) U.S. Cl. .................................... 296/65.09

(58) Field of Classification Search ............... 296/65.09, 296/64, 65.01, 65.05; 297/15, 331, 341, 297/344.1, 354.12, 378.1, 378.12
See application file for complete search history.

(56) References Cited

U.S. PATENT DOCUMENTS

| 5,010,668 | A | * | 4/1991 | Zeligson | 40/324 |
| 5,529,381 | A | * | 6/1996 | Zhao et al. | 297/479 |
| 5,842,743 | A | * | 12/1998 | Wright et al. | 297/378.1 |
| 5,941,591 | A | * | 8/1999 | Tsuge et al. | 296/65.09 |
| 6,196,613 | B1 | | 3/2001 | Arai | |
| 6,698,813 | B2 | | 3/2004 | Nonaka et al. | |
| 6,997,500 | B2 | * | 2/2006 | Horsford et al. | 296/65.09 |
| 7,014,241 | B2 | * | 3/2006 | Toyota et al. | 296/37.15 |
| 7,152,921 | B2 | * | 12/2006 | Saberan | 297/336 |
| 7,458,635 | B2 | * | 12/2008 | Mendis et al. | 297/238 |
| 2005/0057081 | A1 | * | 3/2005 | Kahn et al. | 297/331 |
| 2009/0108615 | A1 | | 4/2009 | Akiyu et al. | |
| 2009/0179477 | A1 | | 7/2009 | Yamazaki et al. | |
| 2010/0141004 | A1 | * | 6/2010 | Zeimis et al. | 297/336 |

FOREIGN PATENT DOCUMENTS

| DE | 102006012137 | 9/2007 |
| EP | 0622268 | 11/1994 |
| JP | 3083264 U | 10/2001 |
| JP | 2003-165366 | 6/2003 |

(Continued)

OTHER PUBLICATIONS

English language Abstract of JP 2007-153216, Jun. 21, 2007.

(Continued)

*Primary Examiner* — Kiran B. Patel
(74) *Attorney, Agent, or Firm* — Greenblum & Bernstein, P.L.C.

(57) ABSTRACT

A vehicle seat is provided. The vehicle seat includes: a seat cushion and a seatback. The seat cushion includes a seating part, a front leg which is rotatably attached to and supports the seating part at a front side, and a pair of left and right rear legs which support a rear side of the seating part. The seatback is provided to the rear side of the seat cushion so as to be capable of falling rearward. The front leg is rotatably attached to a vehicle floor. The rear legs are detachably attached to the vehicle floor. The vehicle seat is adapted to be arranged from a seating mode into at least three of a plurality of modes including a table mode, a rear seat enter/exit mode, a storage mode, a foot rest mode, a flat luggage compartment mode, a rearward facing child safety seat mode.

10 Claims, 10 Drawing Sheets

FOREIGN PATENT DOCUMENTS

| | | |
|---|---|---|
| JP | 2003-165367 | 6/2003 |
| JP | 2003-226176 | 8/2003 |
| JP | 2003-237436 | 8/2003 |
| JP | 2003-276548 | 10/2003 |
| JP | 2003-276556 | 10/2003 |
| JP | 2005-343276 | 12/2005 |
| JP | 2007-153216 | 6/2007 |
| JP | 2007-153217 | 6/2007 |
| JP | 2007-153218 | 6/2007 |

OTHER PUBLICATIONS

English language Abstract of JP 2007-153217, Jun. 21, 2007.
English language Abstract of JP 2007-153218, Jun. 21, 2007.
Nissan Nuvu Concept from Paris Motor Show (Oct. 2-Oct. 19, 2008).
Suzuki px Concept from Tokyo Motor Show (Oct. 21-Nov. 6, 2005).
Mazda Neospace Concept from Frankfurt Motor Show (Sep. 14-Sep. 26, 1999).
Nissan yanya Concept from Geneva Motor Show (Mar. 5-Mar. 18, 2002).
Renault Be Bop Concept from Frankfurt Motor Show (Sep. 9-Sep. 21, 2003).
Nissan Kino Concept from Tokyo Motor Show (Oct. 27-Nov. 7, 2001).
Mitsubishi EZ MIEW 02 Concept from Geneva Motor Show (Mar. 2-Mar. 12, 2006).
Isuzu Zen Concept from Tokyo Motor Show (Oct. 27-Nov. 7, 2001).
Nissan Bevel Concept from Detroit Motor Show (Jan. 7-Jan. 21, 2007).
English language Abstract of JP 2005-343276, Dec. 15, 2005.
English language Abstract of JP 2003-165367, Jun. 10, 2003.
English language Abstract of JP 2003-226176, Aug. 12, 2003.
English language Abstract of JP 2003-237436, Aug. 27, 2003.
English language Abstract of JP 2003-276548, Oct. 2, 2003.
English language Abstract of JP 2003-276556, Oct. 2, 2003.
English language Abstract of JP 2003-165366, Jun. 10, 2003.
U.S. Appl. No. 12/480,005 to Kuno, which was filed on Jun. 8, 2009.

* cited by examiner

VEHICLE SEAT

BACKGROUND OF THE INVENTION

1. Field of the Invention

The present invention relates to a vehicle seat, and more particularly, to a vehicle seat which can be arranged into a variety of modes from a seating mode in which an occupant sits on.

2. Description of the Related Art

A front passenger seat can be arranged into a variety of modes from a seating mode in which an occupant sits on. The variety of modes includes, for example, a table mode in which a back side of a seatback is used as a table, a rear seat passenger enter/exit mode in which the seatback takes a forwardly tilting posture so as to facilitate entering and exiting of a rear seat occupant into and from a rear seat, or a storage mode in which a seat cushion and the seatback are folded so as to utilize a space widely within a passenger compartment. In this way, the front passenger seat can be used for various purposes in addition to a regular purpose of allowing an occupant to sit on.

Japanese Utility Model Registration No. 3083264 is known as a related-art document of the present application.

However, the above-described front passenger seat can be arranged into only one of the variety of modes. Therefore, the front passenger seat might be sufficiently useful. Therefore, it has been conceived of a front passenger seat which can be arranged into a plurality of modes in the variety of modes. However, in this case, the configuration of the front passenger seat might become complex.

SUMMARY OF THE INVENTION

It is an aspect of the present invention to provide a vehicle seat which improves the usefulness with simple configuration.

According to an exemplary embodiment of the present invention, there is provided a vehicle seat comprising: a seat cushion and a seatback. The seat cushion comprises: a seating part which configures an occupant seating portion; a front leg which is rotatably attached to the seating part at a front side of the seating part to support the seating part; and a pair of left and right rear legs which support a rear side of the seating part. The seatback is provided to the rear side of the seat cushion so as to be capable of falling rearward. The front leg is rotatably attached to a vehicle floor at a distal end thereof. The pair of left and right rear legs are detachably attached to the vehicle floor at distal ends thereof. The vehicle seat is adapted to be arranged from a seating mode in which the seatback is locked in an upright state relative to the seat cushion and both of the distal ends of the rear legs are locked relative to the vehicle floor, into at least three of a plurality of modes. The plurality of modes comprises: a table mode, in which the seatback is fell forward together with the seat cushion about a pivot at a proximal end of the front leg until a back side of the seatback becomes substantially horizontal while the front leg of the seat cushion falling rearward by unlocking the lock on the rear legs among the lock on the seatback and the lock on the rear legs, and the seatback is held on an instrument panel side in such a state that the seatback is kept falling forward; a rear seat enter/exit mode, in which: the seatback is fell forward together with the seat cushion about the pivot at the proximal end of the front leg until the seatback comes to take a forwardly tilting posture while the front leg of the seat cushion falling forward by unlocking the lock on the rear legs among the lock on the seatback and the lock on the rear legs, and the seatback is held on the instrument panel side in such a state that the seatback is kept falling forward; a storage mode, in which: the seatback is fell rearward relative to the seat cushion while the front leg of the seat cushion falling forward by unlocking both of the lock on the seatback and the lock on the rear legs, the seat cushion is turned forward with the seatback kept falling rearward so that a back supporting surface of the seatback and a seating surface of the seating part of the seat cushion fit, respectively, to the instrument panel and a toe board provided below the instrument panel and that the seating part of the seat cushion and the front leg of the seat cushion form a substantially V shape, and the seat cushion and the seatback are held on the instrument panel side in such a state that the seat cushion is kept turning forward; a foot rest mode in which: the seatback is fell rearward relative to the seat cushion while the front leg of the seat cushion falling forward by unlocking both of the lock on the seatback and the lock on the rear legs, the seat cushion is turned forward with the seatback kept falling rearward so that the back supporting surface of the seatback fits to the instrument panel and that the seating part of the seat cushion and the front leg of the seat cushion form a substantially inverted V shape in contrast to the substantially V shape formed in the storage mode, and the seat cushion and the seatback are held on the instrument side in such a state that the seat cushion is kept turning forward; a flat luggage compartment mode, in which: the seatback is fell rearward relative to the seat cushion while the front leg of the seat cushion falling forward by unlocking both the lock on the seatback and the lock on the rear legs, the seat cushion is turned forward with the seatback kept falling rearward so that the back supporting surface of the seatback fits to the instrument panel and that a back side of the seating surface of the seating part of the seat cushion becomes substantially horizontal, and the seat cushion and the seatback are held on the instrument panel side in such a state that the seat cushion is kept turning forward; and a rearward facing child safety seat mode, in which: the seatback is fell rearward relative to the seat cushion while the front leg of the seat cushion falling rearward by unlocking both of the lock on the seatback and the lock on the rear legs, the seat cushion is turned forward with the seatback kept falling rearward so that the back side of the seating surface of the seating part of the seat cushion becomes substantially horizontal and that the seatback is put in an upright state relative to the seat cushion, and the seat cushion and the seatback are held on the instrument panel side in such a state that the seat cushion is kept turning forward.

According to this configuration, the vehicle seat is made up of the seat cushion which includes the seating part, the front leg and the pair of left and right rear legs, and the seatback. Accordingly, the vehicle seat has a simple configuration. In addition, the vehicle seat can be arranged from the seating mode into at least three modes in the modes including the table mode, the rear seat enter/exit mode, the storage mode, the foot rest mode, the flat luggage compartment mode and the rearward faxing child safety seat mode. Consequently, even with the vehicle seat having the simple configuration, the usefulness thereof can be enhanced.

According to another exemplary embodiment of the present invention, there is provided a vehicle seat comprising: a seat cushion and a seatback. The seta cushion comprises: a seating part which configures an occupant seating portion; a pair of left and right front legs which are rotatably attached to the seating part at a front side of the seating part to support the seating part; and a pair of left and right rear legs which support a rear side of the seating part. The seatback is provided to the rear side of the seat cushion so as to be capable of falling rearward. The pair of left and right front legs are rotatably attached to a vehicle floor at distal ends thereof. The pair of left and right rear legs are detachably attached to the vehicle floor at distal ends thereof. The vehicle seat is adapted to be arranged from a seating mode in which the seatback is locked in an upright state relative to the seat cushion and both of the distal ends of the rear legs are locked relative to the vehicle floor, into a plurality of modes. The plurality of modes comprises: a table mode, in which the seatback is fell forward together with the seat cushion about a pivot at a proximal end of the front leg until a back side of the seatback becomes substantially horizontal while the front leg of the seat cushion falling rearward by unlocking the lock on the rear legs among the lock on the seatback and the lock on the rear legs, and the seatback is held on an instrument panel side in such a state that the seatback is kept falling forward; a rear seat enter/exit mode, in which: the seatback is fell forward together with the seat cushion about the pivot at the proximal end of the front leg until the seatback comes to take a forwardly tilting posture while the front leg of the seat cushion falling forward by unlocking the lock on the rear legs among the lock on the seatback and the lock on the rear legs, and the seatback is held on the instrument panel side in such a state that the seatback is kept falling forward; a storage mode, in which: the seatback is fell rearward relative to the seat cushion while the front leg of the seat cushion falling forward by unlocking both of the lock on the seatback and the lock on the rear legs, the seat cushion is turned forward with the seatback kept falling rearward so that a back supporting surface of the seatback and a seating surface of the seating part of the seat cushion fit, respectively, to the instrument panel and a toe board provided below the instrument panel and that the seating part of the seat cushion and the front leg of the seat cushion form a substantially V shape, and the seat cushion and the seatback are held on the instrument panel side in such a state that the seat cushion is kept turning forward; a foot rest mode in which: the seatback is fell rearward relative to the seat cushion while the front leg of the seat cushion falling forward by unlocking both of the lock on the seatback and the lock on the rear legs, the seat cushion is turned forward with the seatback kept falling rearward so that the back supporting surface of the seatback fits to the instrument panel and that the seating part of the seat cushion and the front leg of the seat cushion form a substantially inverted V shape in contrast to the substantially V shape formed in the storage mode, and the seat cushion and the seatback are held on the instrument side in such a state that the seat cushion is kept turning forward; a flat luggage compartment mode, in which: the seatback is fell rearward relative to the seat cushion while the front leg of the seat cushion falling forward by unlocking both the lock on the seatback and the lock on the rear legs, the seat cushion is turned forward with the seatback kept falling rearward so that the back supporting surface of the seatback fits to the instrument panel and that a back side of the seating surface of the seating part of the seat cushion becomes substantially horizontal, and the seat cushion and the seatback are held on the instrument panel side in such a state that the seat cushion is kept turning forward; and a rearward facing child safety seat mode, in which: the seatback is fell rearward relative to the seat cushion while the front leg of the seat cushion falling rearward by unlocking both of the lock on the seatback and the lock on the rear legs, the seat cushion is turned forward with the seatback kept falling rearward so that the back side of the seating surface of the seating part of the seat cushion becomes substantially horizontal and that the seatback is put in an upright state relative to the seat cushion, and the seat cushion and the seatback are held on the instrument panel side in such a state that the seat cushion is kept turning forward.

According to this configuration, the vehicle seat is made up of the seat cushion which includes the seating part, the pair of left and right front legs and the pair of left and right rear legs, and the seatback. Because of this, the vehicle seat has a simple construction. In addition, the vehicle seat can be arranged from the seating mode into all the modes including the table mode, the rear seat enter/exit mode, the storage mode, the foot rest mode, the flat luggage compartment mode and the rearward faxing child safety seat mode. Consequently, even with the vehicle seat having the simple construction, the usefulness thereof can be enhanced.

DETAILED DESCRIPTION

Figure 1:
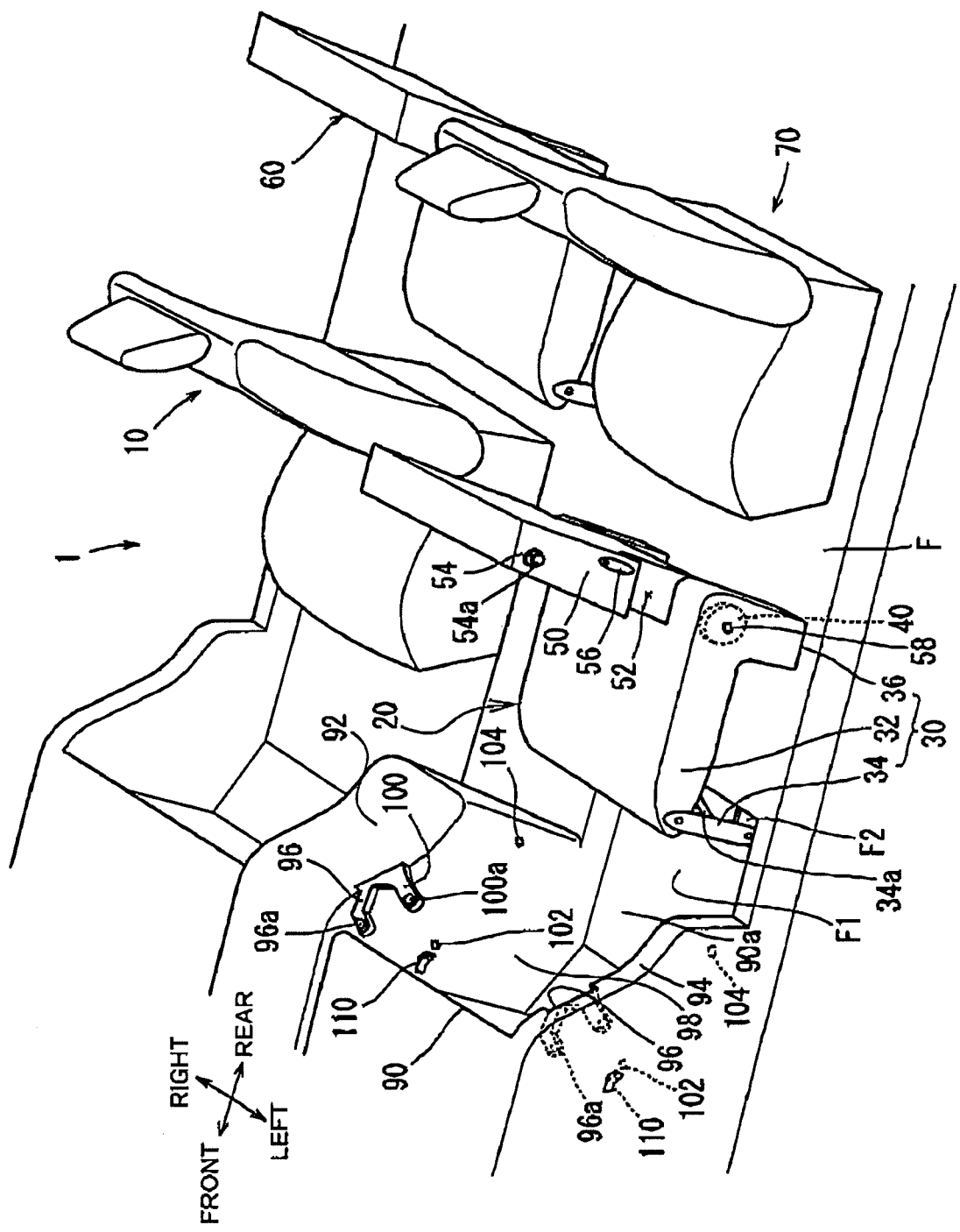
FIG. 1 is a schematic perspective view of an interior of a vehicle including a vehicle seat according to an embodiment of the present invention when the vehicle seat is arranged into a seating mode.
Figure 2:
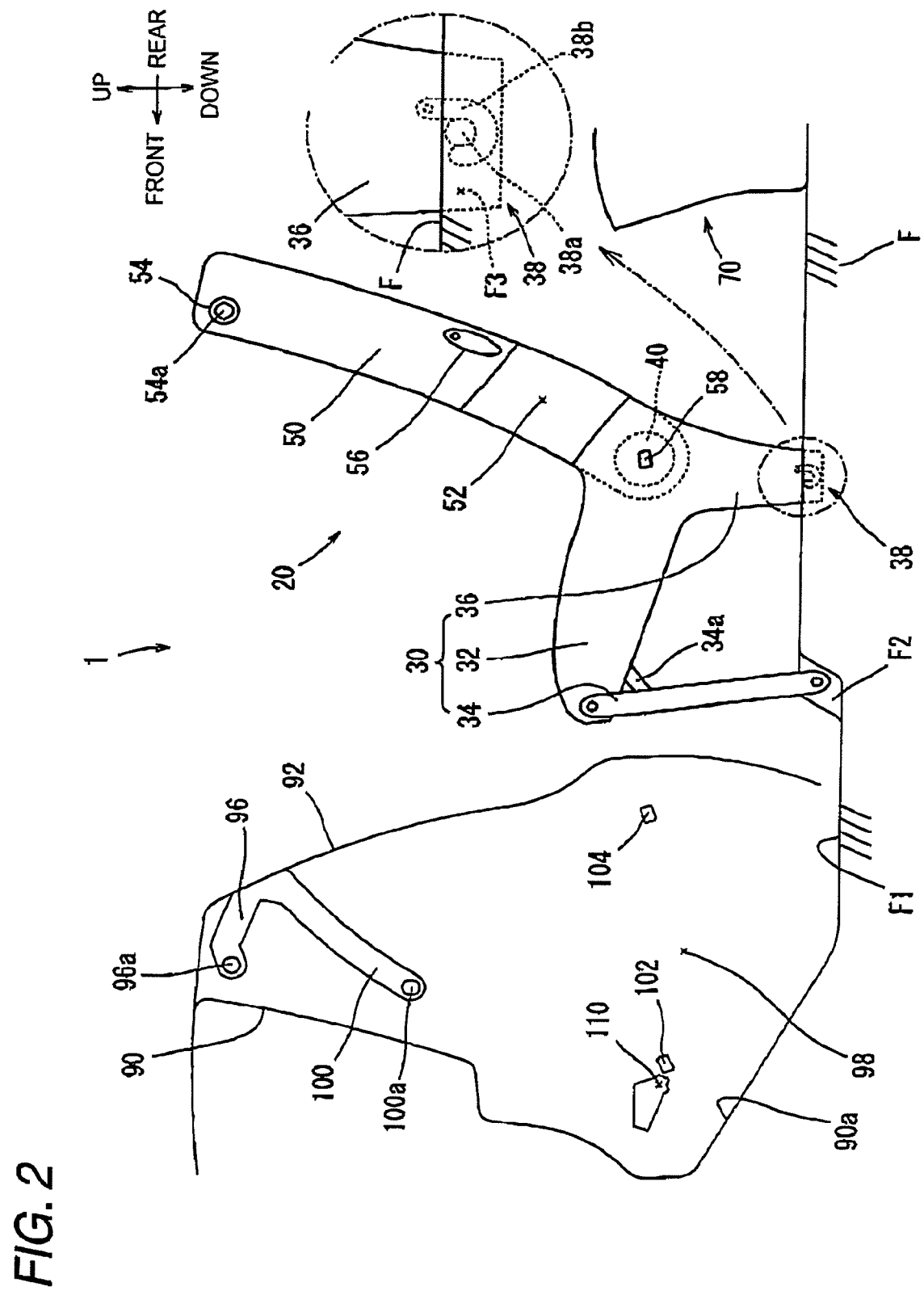
FIG. 2 is an exemplary diagram of the vehicle seat shown in FIG. 1 when seen from a side.
Figure 3:
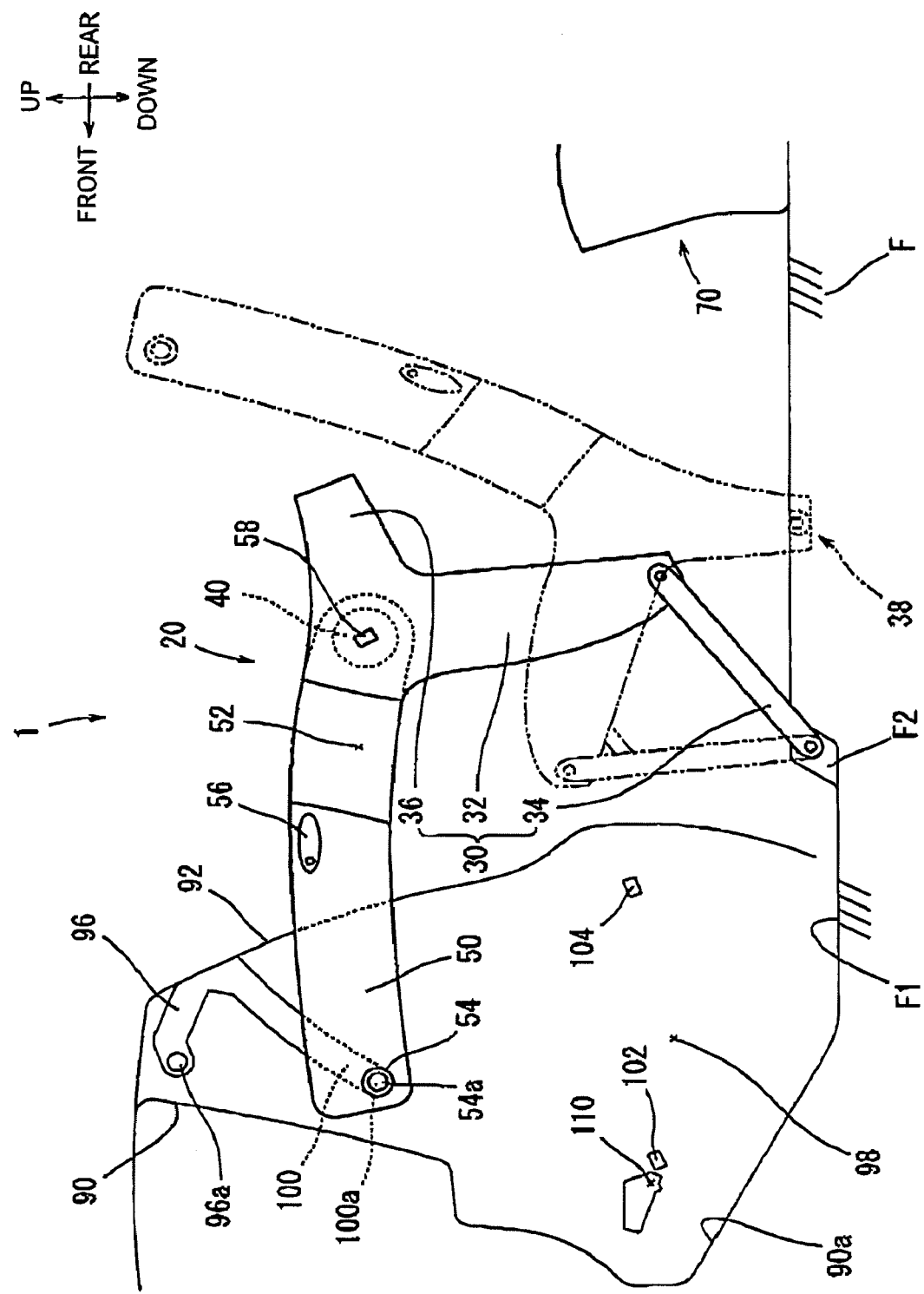
FIG. 3 is an exemplary diagram showing a state in which the vehicle seat shown in FIG. 2 is arranged into a table mode.
Figure 4:
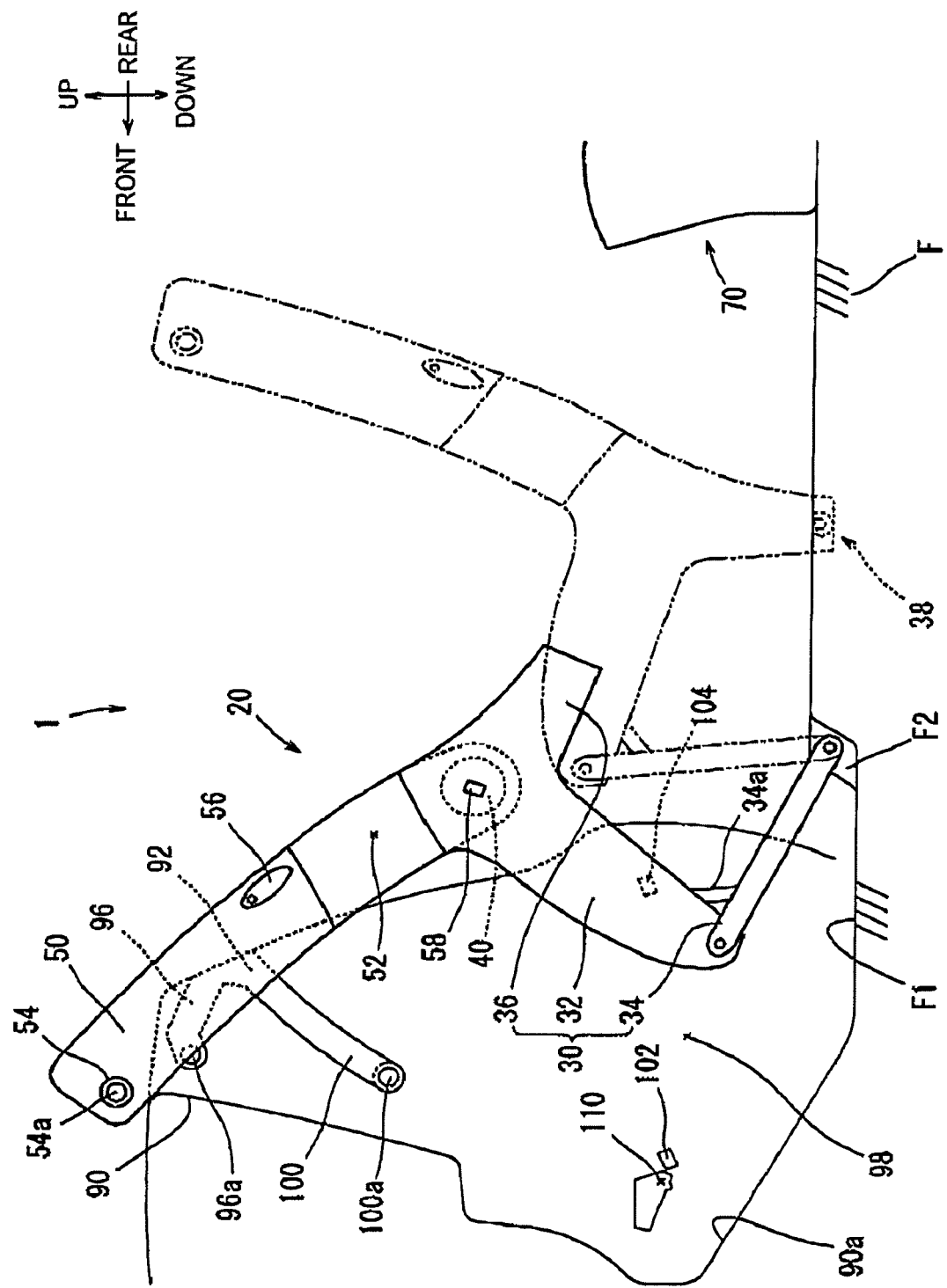
FIG. 4 is an exemplary diagram showing a state in which the vehicle seat shown in FIG. 2 is arranged into a rear seat enter/exit mode.
Figure 5:
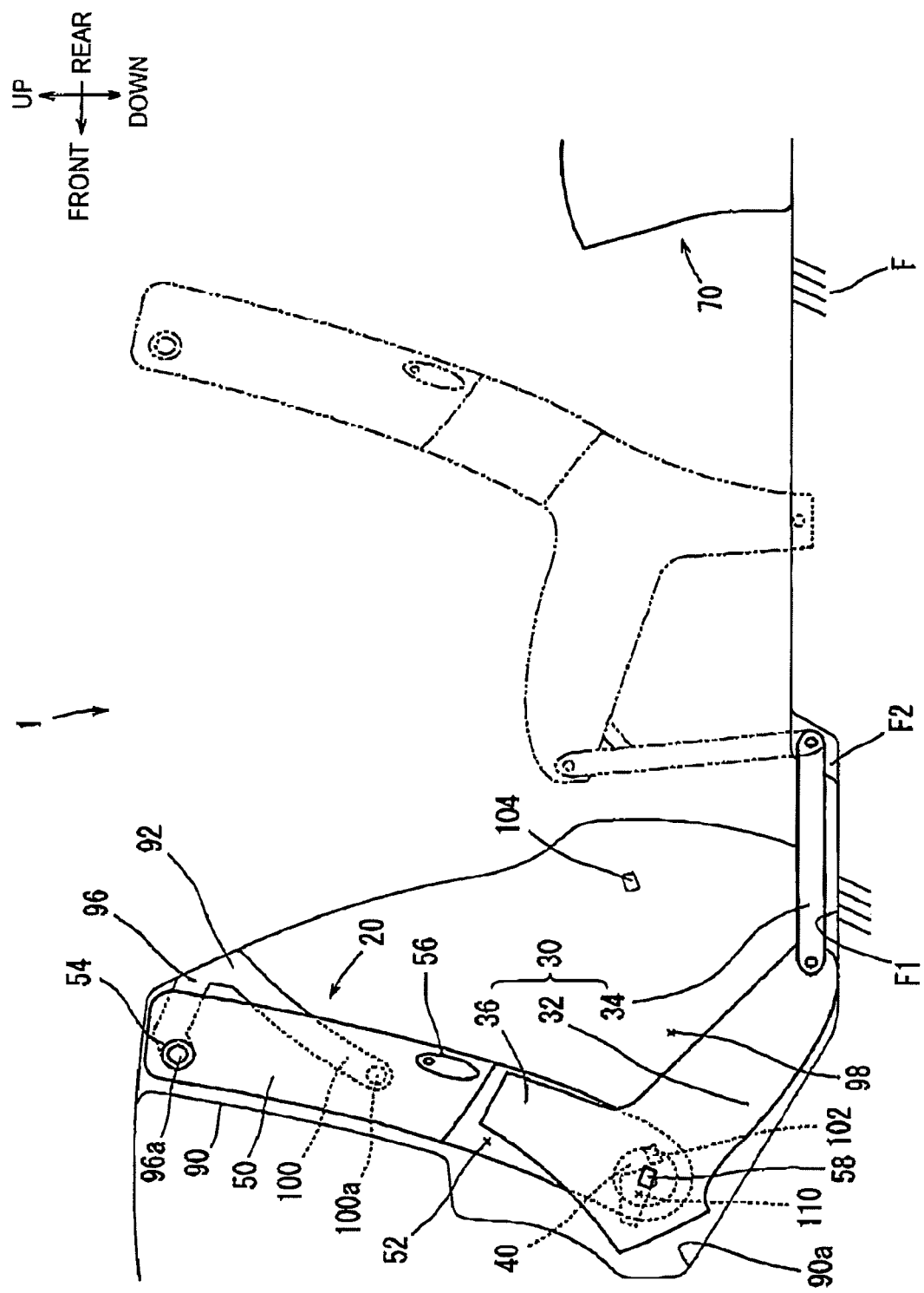
FIG. 5 is an exemplary diagram showing a state in which the vehicle seat shown in FIG. 2 is arranged into a storage mode.
Figure 6:
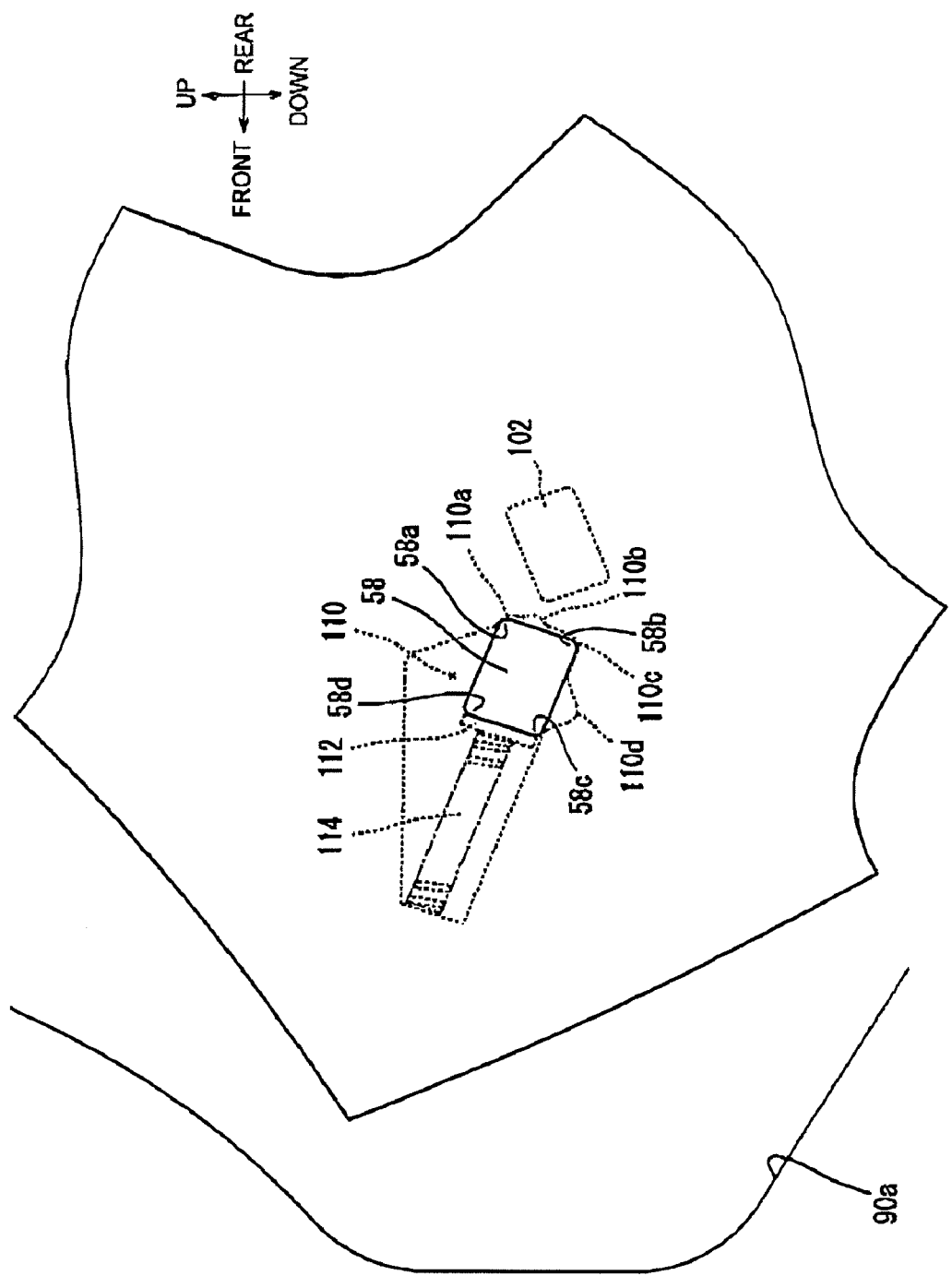
FIG. 6 is an enlarged view of a main part of FIG. 5.
Figure 7:
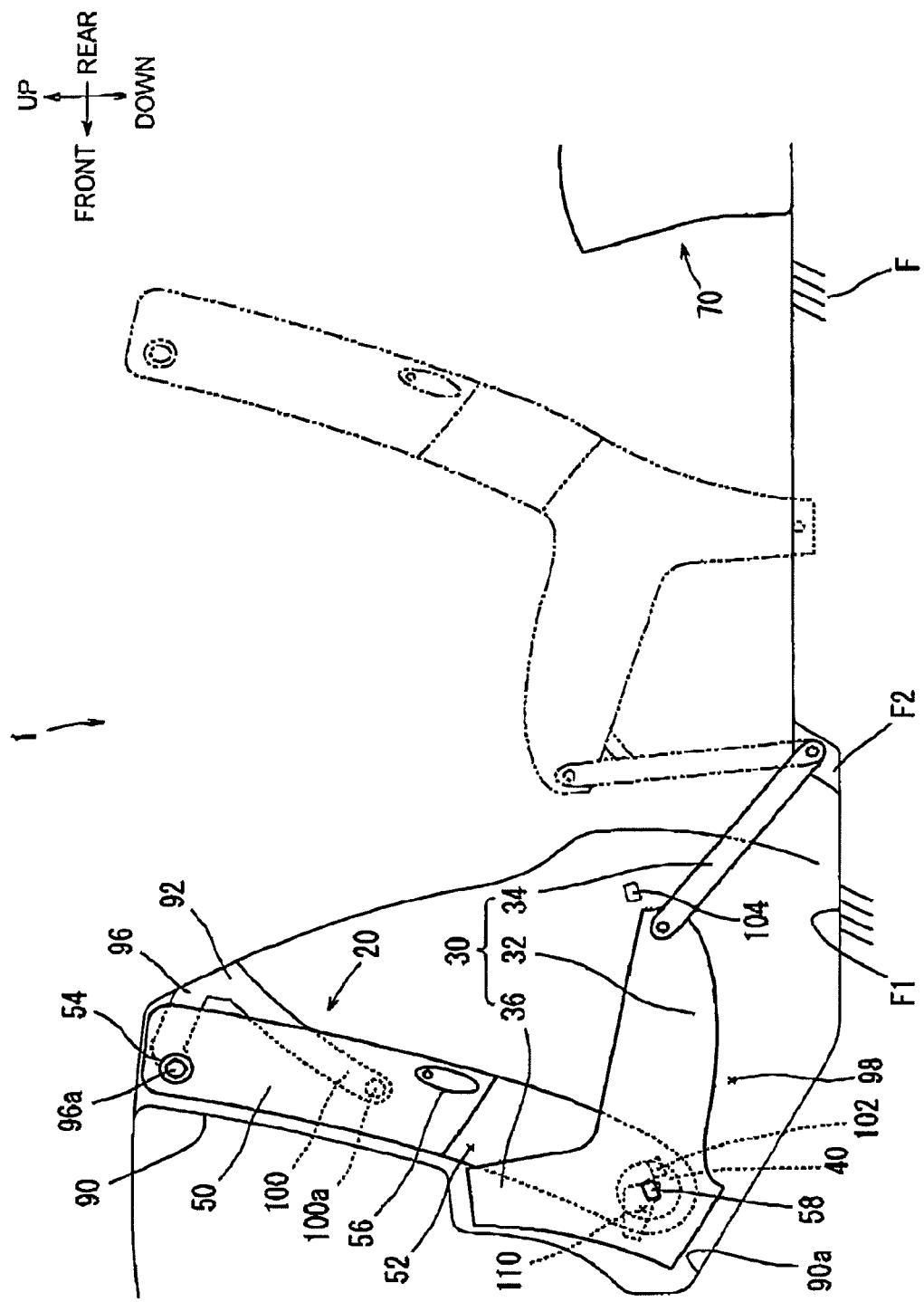
FIG. 7 is an exemplary diagram showing a state in which the vehicle seat shown in FIG. 2 is arranged into a foot rest mode.
Figure 8:
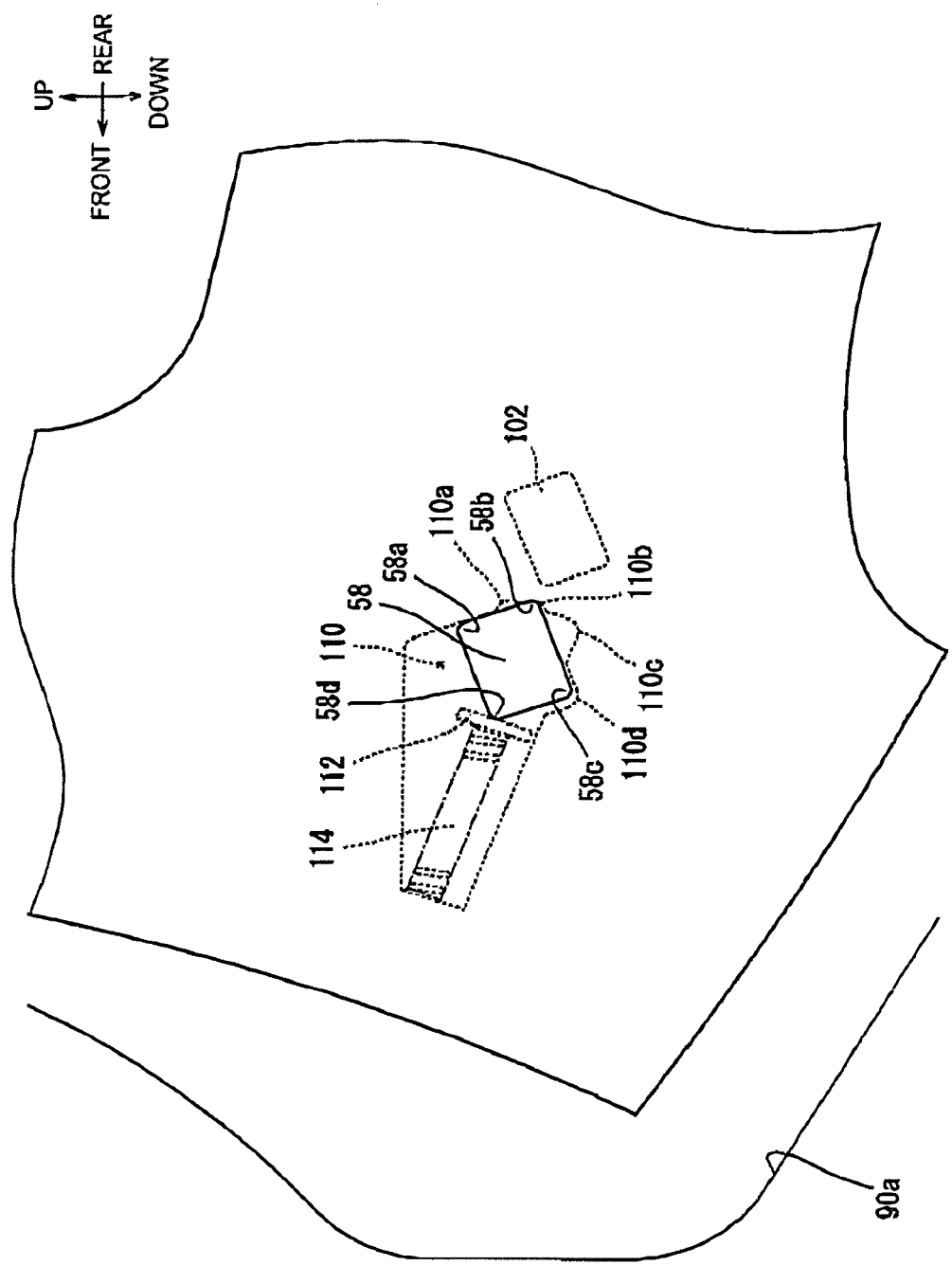
FIG. 8 is an enlarged view of a main part of FIG. 7.
Figure 9:
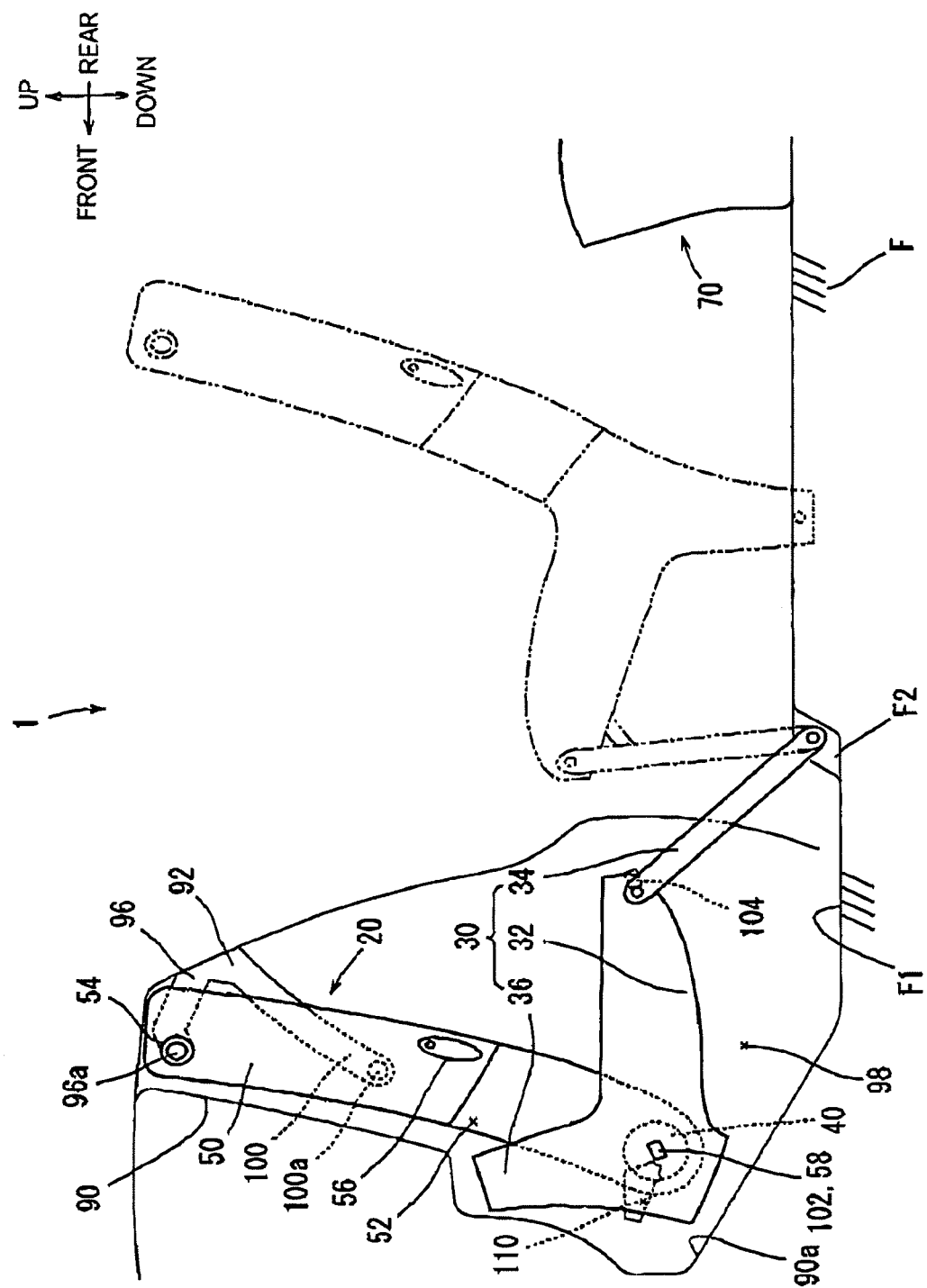
FIG. 9 is an exemplary diagram showing a state in which the vehicle seat shown in FIG. 2 is arranged into a flat luggage compartment mode.
Figure 10:
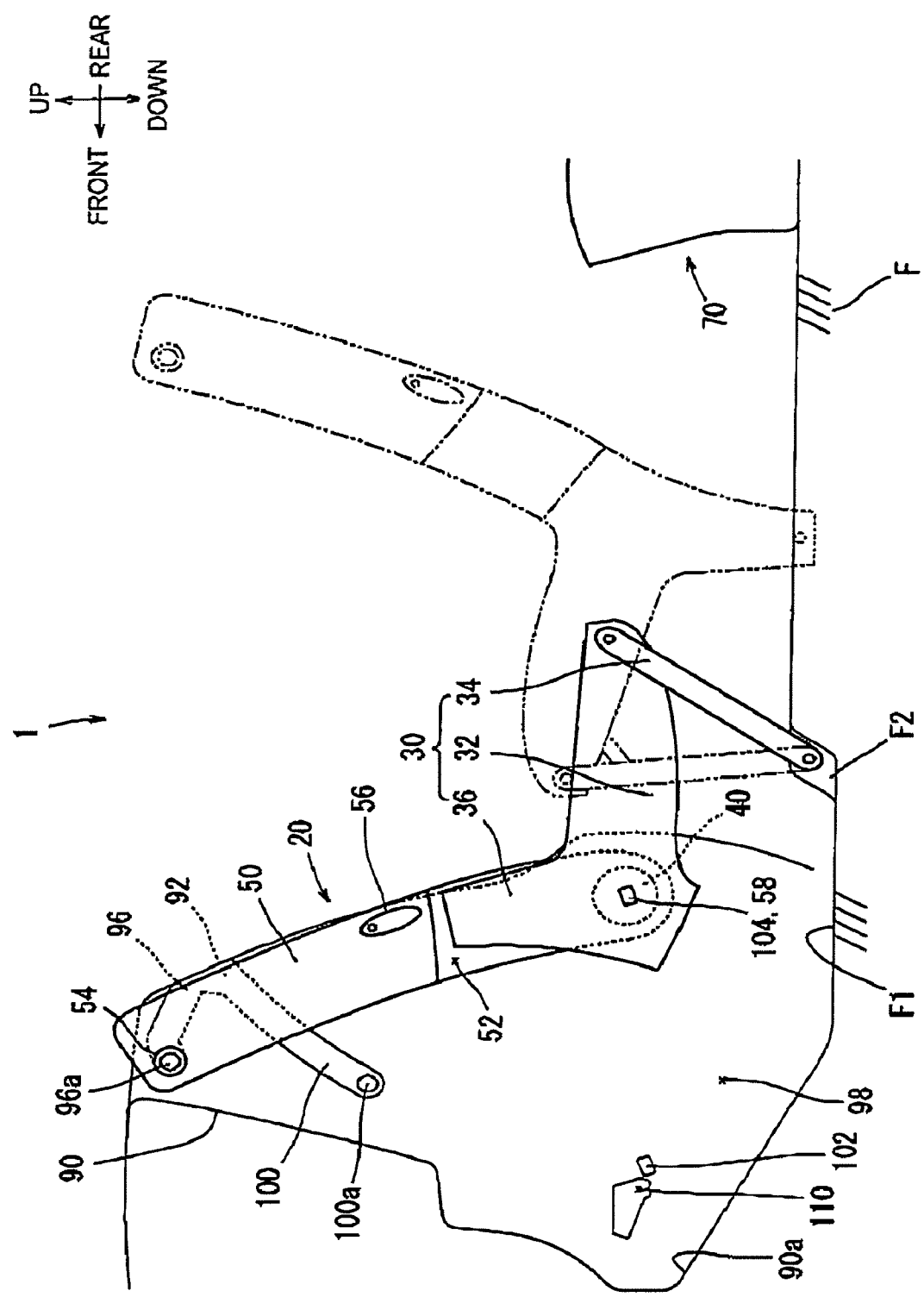
FIG. 10 is an exemplary diagram showing a state in which the vehicle seat shown in FIG. 2 is arranged into a rearward facing child safety seat.

Hereinafter, exemplary embodiments of the present invention will be described with reference to FIGS. 1 to 10. FIG. 1 is a schematic perspective view of an interior of a vehicle including a vehicle seat according to an embodiment of the present invention when the vehicle seat is arranged into a seating mode. FIG. 2 is an exemplary diagram resulting when FIG. 1 is seen from the side. FIG. 3 is an exemplary diagram showing a state in which the vehicle seat shown in FIG. 2 is arranged into a table mode. FIG. 4 is an exemplary diagram showing a state in which the vehicle seat shown in FIG. 2 is arranged into a rear seat enter/exit mode. FIG. 5 is an exemplary diagram showing a state in which the vehicle seat shown in FIG. 2 is arranged into a storage mode. FIG. 6 is an enlarged view of a main part of FIG. 5. FIG. 7 is an exemplary diagram showing a state in which the vehicle seat shown in FIG. 2 is arranged into a foot rest mode. FIG. 8 is an enlarged view of a main part of FIG. 7. FIG. 9 is an exemplary diagram showing a state in which the vehicle seat shown in FIG. 2 is arranged into a flat luggage compartment mode. FIG. 10 is an exemplary diagram showing a state in which the vehicle seat shown in FIG. 2 is arranged into a rearward facing child safety seat.

It is noted that in the following description, up, down, front, rear, left and right denotes, upward, downward, forward, rearward, leftward and rightward directions which are described in the drawings, respectively, that is, upward, downward, forward, rearward, leftward and rightward directions based on a vehicle 1.

Firstly, referring to FIGS. 1, 2, a vehicle 1 including a vehicle seat according to an embodiment of the present invention will be described. This vehicle 1 has four seats in total which include a driver seat 10, a front passenger seat 20, and a driver seat side rear seat 60 and a front passenger seat side rear seat 70 which are disposed behind the respective front seats. In addition, in these four seats, the front passenger seat 20 corresponds to the vehicle seat of the present invention. Additionally, in these four seats, the driver seat 10, the driver seat side rear seat 60 and the front passenger seat side rear seat 70 are known seats, and therefore, a detailed description thereof will be omitted here. Accordingly, only the configuration of the front passenger seat 20 will be described herein.

The front passenger seat 20 is made up of a seat cushion 30 and a seatback 50. Hereinafter, these respective constituent component members 30, 50 will be described individually. Firstly, the seat cushion 30 will be described. The seat cushion 30 is made up of a seating part 32 which constitutes an occupant's seating portion, a pair of left and right front legs 34, 34 which support a front side of the seating part 32, and a pair of left and right rear legs 36, 36 which support a rear side of the seating part 32. It is noted that the pair of left and right front legs 34, 34 may be one front leg as long as the front leg supports the front side of the seating part 32. Quadrangular pins 58, 58 are provided to the seating part 32 at left and right positions of the rear side thereof so as to advance and retreat relative to surfaces of the positions. Both of the quadrangular pins 58 are provided so as to be urged in an advancing direction.

Both of the front legs 34 are rotatably attached to the seating part 32 at proximal ends thereof so as to rotate about pivots whose axial directions are oriented in a width direction (a left-right direction) of the seating part 32. Both of the front legs are provided with stoppers 34a which interfere with the seating part 32, respectively. With this configuration, when the seat cushion 30 is locked relative to a vehicle floor F by locking mechanisms 38, which will be described later, both the front legs 34 are regulated so as not to fall forward together with the seatback 50. Accordingly, when the seat cushion 30 is put in a locked state, the occupant can sit on the seating part 32. On the other hand, both of the rear legs 36 are configured such that proximal ends thereof are integral with the seating part 32.

Next, the seatback 50 will be described. The seatback 50 configures a back supporting portion which supports the back of the occupant sitting on the seat cushion 30 and is assembled (provided) to a rear side of the seat cushion 30 via a simple reclining mechanism 40. A lock device (not shown) is provided on this simple reclining mechanism 40. With this configuration, the seatback 50 can be locked (held) in an upright state relative to the seat cushion 30, and when the lock is unlocked, the seatback 50 becomes rotatable to fall rearward (recline) relative to the seat cushion 30.

The seatback 50 is formed with cutouts 52, 52 at lower positions of the left and right sides of the seatback 50. With this configuration, when the seatback 50 is rotated to fall rearward relative to the seat cushion 30, both the rear legs 36 of the seat cushion 30 comes to fit into both the cutouts 52, respectively. Further, the seatback is formed with projections 54, 54 at upper positions of the left and right sides of the seatback 50. The projections 54, 54 are provided with round pins 54a, 54a so as to advance and retreat relative to surfaces of the projections. Both the round pins 54a, 54a are urged in a direction in which the round pins 54a advance.

In addition, a lever 56 is provided to the left side of the seatback 50 to be operable by the occupant 56. Specifically, the lever 56 is configured to be operated in two stages. Among the two stage operations, when a first stage is performed, both the round pins 54a and both the quadrangular pins 58 are caused to retreat into an interior of the seatback 50 and an interior of the seating part 32, respectively, against the urging forces, and the lock mechanisms 38 is unlocked, which will be described later. When a second stage operation is performed, the lock on the seatback 50 by the simple reclining mechanism 40 is unlocked.

The seat cushion 30 and the seatback 50 are each integrally molded of a synthetic resin which has rigidity as a material quality thereof. In addition, when compared with a seat cushion and a seatback of the driver seat 10, the seat cushion 30 and the seatback 50 are formed compact. Namely, the driver seat 10 is made up of a larger size seat, while the front passenger seat 20 is made up of a smaller size seat. The front passenger seat 20 is configured in the way described above.

Next, a mounting configuration of the front passenger seat 20 to the vehicle floor F will be described. Both the front legs 34 of the seat cushion 30 are rotatably attached, respectively, to mounting brackets F2 which are formed at stepped portions F1 of the vehicle floor F at distal ends thereof so as to rotate about pivots whose axial directions are oriented in a vehicle width direction. In addition, both the rear legs 36 of the seat cushion 30 are detachably attached (mounted) to the vehicle floor F at distal ends thereof via the locking mechanisms 38.

Here, the lock mechanism 38 will be described in detail. The lock mechanism 38 is made up of a striker 38a which is formed on the vehicle floor F (for example, a recess portion F3 which is formed in the vehicle floor F), and a hook 38b which is formed on the rear leg 36. When the lock mechanism 38 is put in a locked state in which the hook 38b is brought into engagement with the striker 38a, the seat cushion 30 (the seating part 32) is locked on the vehicle floor F so that the occupant can sit thereon. In this state, the front passenger seat 20 is disposed in such a manner as to be substantially parallel to the driver seat 10. In this way, the front passenger seat 20 is mounted on the vehicle floor F.

Additionally, the front passenger seat 20 is mounted on to the vehicle floor F so as to face an instrument panel 90 of the vehicle in front of the front passenger seat 20. First guide grooves 96, 96 and second guide grooves 100, 100 are formed on a left side wall surface of a center console 92 and a front passenger seat side panel surface 94 of the instrument panel 90. The first grooves 96, 96 or the second grooves 100, 100 are configured to guide the projections of the seatback 50, respectively.

First pin catches 96, 96 are formed at terminating ends of both the first guide grooves 96 so that the round pins 54a of both die projections 54 of the seatback 50 can be fitted thereinto when the front passenger seat 20 is arranged into a storage mode, a foot rest mode, a flat luggage compartment mode, or a rearward facing child safety seat mode. Similarly, second pin catches 100a, 100a are formed at terminating ends of both the second guide grooves 100 so that the round pins 54a of both the projections 54 of the seatback 50 can be fitted thereinto when the front passenger seat 20 is arranged into a table mode.

In addition, engagement holes 110, 110 are formed on the left wall surface of the center console 92 and the front passenger seat side panel surface 94 so that both the quadrangular pins 58 of the seat cushion 30 can be fitted thereinto when the front passenger seat 20 is arranged into the storage mode. Specifically, an interior of the engagement hole 110 is formed into a substantially rectangular shape so that the quadrangular pin 58 can move in a substantially front-rear direction in the interior of the engagement hole 110.

The engagement hole 110 includes a first recess 110a and a third recess 110c therein so that a first corner 58a and a second corner 58b of the quadrangular pin 58 of the seat cushion 30 can be fitted therein, respectively, for the front passenger seat 20 to be arranged into the storage mode. Further, the engagement hole 110 includes a second recess 100b and a fourth recess 100d therein so that a second corner 58b and a third corner 58c of the quadrangular pin 58 of the seat cushion 30 are fitted thereinto, respectively, for the front passenger seat 20 to be arranged into the foot rest mode. Furthermore, the engagement hole 110 includes a compression spring 114 therein, which is attached with a pin presser at a distal end side thereof. With this configuration, when both the quadrangular pins 58 are fitted in both the engagement holes 110, respectively, the quadrangular pins 58 are urged towards the rear by the pin pressers 12 at all times.

Third pin catches 102 are formed on the left wall surface of the center console 92 and the front passenger seat side panel surface 94 so that both the quadrangular pins 58 of the seat cushion 30 can be fitted therein for the front passenger seat 20 to be arranged into the flat luggage compartment mode. Similarly, fourth pin catches 104 are formed on the left wall surface of the center console 92 and the front passenger seat side panel surface 94 so that both the quadrangular pins 58 of the seat cushion 30 can be fitted therein for the front passenger seat 20 to be arranged into the rearward facing child safety seat mode.

Hereinafter, the operation of the front passenger seat 20 which is configured as described above will be described. This front passenger seat 20 can be arranged into a seating mode, the table mode, a rear seat enter/exit mode, the storage mode, the foot rest mode, the flat luggage compartment mode and the rearward facing child safety seat mode. Hereinafter, the respective modes and methods of arranging the front passenger seat 20 into the respective modes from the seating mode will be described individually.

[Seating Mode]
Referring to FIGS. 1 and 2, the seating mode will be described. In the seating mode the seatback 50 is locked in an upright state relative to the seat cushion 30 by the simple reclining mechanism 40, and both the distal ends of the pair of left and right rear legs 36, 36 are locked on the vehicle floor F by the lock mechanisms 38. When the front passenger seat 20 is arranged into this seating mode, the occupant can sit on the seat cushion 30 and the back of the occupant can be supported on the seatback 50 in the seated state.

[Table Mode]
Referring to FIG. 3, the table mode will be described. In the table mode, the seatback 50 is held on the instrument panel 90 side so that a back side of the seatback 50 becomes substantially horizontal. When the front passenger seat 20 is arranged into this table mode, the occupant can use the back side of the seatback 50 as a table.

[Rear Seat Enter/Exit Mode]
Referring to FIG. 4, the rear seat enter/exit mode will be described. In the rear seat enter/exit mode, the front passenger seat 20 is held on the instrument panel 90 side so that the seatback takes a forwardly tilting posture. When the front passenger seat 20 is arranged into this rear seat enter/exit mode, the entering and exiting of the occupant with respect to the driver seat side rear seat 60 or the front passenger seat side rear seat 70 is facilitated.

[Storage Mode]
Referring to FIG. 5, the storage mode will be described. In the storage mode, both the seat cushion 30 and the seatback 50 are held on the instrument panel 90 side so that a back supporting surface of the seatback 50 and a seating surface of the seating part 32 of the seat cushion 30 fit to the instrument panel 90 and a toe board which lies below the instrument panel 90, respectively. When the front passenger seat 20 is arranged into the storage mode, the occupant can use a space widely within a passenger compartment of the vehicle 1.

[Foot Rest Mode]
Referring to FIG. 7, the foot rest mode will be described. In the foot rest mode, both the seat cushion 30 and the seatback 50 are held on the instrument panel 90 side so that the back supporting surface of the seatback 50 fits to the instrument panel 90 and that the seating part 32 of the seat cushion 30 and the front legs 34 of the seat cushion 30 form a substantially inverted V shape in contrast to a V shape which is formed by the seating part 32 and the front legs 34 in the above-described storage mode. When the front passenger seat 20 is arranged into this foot rest mode, the occupant in the front passenger seat side rear seat 70 can use the seat cushion 30 of the front passenger seat 20 as a foot rest (a support for the occupant's feet).

[Flat Luggage Compartment Mode]
Referring to FIG. 9, the flat luggage compartment mode will be described. The flat luggage compartment mode means a mode in which both the seat cushion 30 and the seatback 50 are held on the instrument panel 90 side so that the back supporting surface of the seatback 50 fits to the instrument panel 90 and that a back side of the seating surface of the seating part 32 of the seat cushion 30 becomes substantially horizontal. When the front passenger seat 20 is arranged into this flat luggage compartment mode, the occupant in the driver seat side rear seat 60 or the front passenger seat side rear seat 70 can place his or her luggage on the seat cushion 30 of the front passenger seat 20 easily.

[Rearward Facing Child Safety Seat Mode]
Lastly, referring to FIG. 10, the rearward facing child safety seat mode will be described. In the rearward facing child safety seat mode, both the seat cushion 30 and the seatback 50 are held on the instrument panel 90 side so that the back side of the seating surface of the seating part 32 of the seat cushion 30 becomes substantially horizontal and that the seatback 50 is put in the upright state relative to the seat cushion 30. When the front passenger seat 20 is arranged into this rearward facing child safety seat mode, the occupant in the driver seat side rear seat 60 or the front passenger seat side rear seat 70 can attach a child safety seat (not shown) to the front passenger seat 20. Namely, in the rearward facing child safety seat mode, the front passenger seat 20 is oriented to the rear.

Hereinafter, methods of arranging the front passenger seat into the respective modes from the seating mode and returning methods will be described. Namely, a method of arranging the front passenger seat 20 into the table mode from the seating mode, a method of arranging the front passenger seat 20 into the rear seat enter/exit mode from the seating mode, a method of arranging the front passenger seat 20 into the storage mode from the seating mode, a method of arranging the front passenger seat 20 into the foot rest mode from the seating mode, a method of arranging the front passenger seat 20 into the flat luggage compartment mode from the seating mode, and a method of arranging the front passenger seat 20 into the rearward facing child safety seat mode from the seating mode will be described individually.

[To Table Mode]

Referring to FIG. 3, a method of arranging the front passenger seat into the table mode from the seating mode will be described. The occupant operates the lever 56 on the front passenger seat 20 to the first stage so as to unlock the locks on the front passenger seat 20 by the looking mechanisms 38. Next, the occupant causes both the seat cushion 30 and the seatback 50 to fall forward about the pivots disposed at proximal ends of the both the front legs 34 until a back side of the seatback 50 becomes substantially horizontal while causing both the front legs 34 to fall rearward.

When a distal end of the seatback 50 reaches a footwell 98 as the seatback 50 falls forward, the occupant causes both the seat cushion 30 and the seatback 50 to fall forward further so that both the projections 54 on the seatback 50 are respectively guided by both the second guide grooves 100 on the center console 92 and the panel surface 94. Then, the round pins 54a of both the projections 54 are made to shift from an advancing state to a retreating state against the urging force exerted thereon.

Then, when the occupant continues causing both the seat cushion 30 and the seatback 50 to fall forward until the back side of the seatback 50 becomes substantially horizontal, since the round pins 54a of both the projections 54 reach the pin catches 100a of both the second guide grooves 100, the round pins 54a are caused to return from the retreating state to the advancing state by virtue of the urging force exerted thereon. Namely, the round pins 54a of both the projections 54 fit in the corresponding pin catches 100a of both the second guide grooves 100. With this action, the seatback 50 can be held on the center console 92 and the panel surface 94 so that the back side of the seatback 50 becomes substantially horizontal. In this way, not only can the front passenger seat 20 be arranged into the table mode but also the front passenger seat 20 can be held on the instrument panel 90 side in such a state that the front passenger seat 20 is kept arranged into the table mode.

Next, a method (a rearranging method) of arranging the front passenger seat 20 back into the seating mode from the table mode will be described. Firstly, the occupant operates the lever 56 on the front passenger seat 20, causing the round pins 54a of both the projections 54 to retreat into interiors of both the projections against the urging forces exerted thereon. Next, the occupant causes the seatback 50 to rise rearward together with the seat cushion 30 while causing both the front legs 34 of the seat cushion 30 to fall forward.

Then, since both the rear legs 36 of the seat cushion 30 reach the vehicle floor F, the hooks 38b of both the rear legs 36 are caused to return to the state where the hooks 38b are in engagement with the corresponding strikers 38a. By this series of actions, the front passenger seat 20 can be returned to the state in which the seat cushion 30 is locked on to the vehicle floor F. In this way, the front passenger seat 20 can not only be rearranged into (returned to) the seating mode, but also be held on the vehicle floor F in such a state that the front passenger seat 20 is rearranged into (returned to) the seating mode (refer to FIG. 2).

[To Rear Seat Enter/Exit Mode]

Referring to FIG. 4, a method of arranging the front passenger seat 20 into the rear seat enter/exit mode from the seating mode will be described. Firstly, the occupant operates the lever 56 on the front passenger seat 20 to the first stage, so as to unlock the locks by the lock mechanisms 38. Next, the occupant causes both the seat cushion 30 and the seatback 50 to fall forward about the pivot shafts at the proximal ends of both the front legs 34 until the seatback 50 is inclined forward, while causing both the front legs 34 of the seat cushion 30 to fall forward. Then, since the seatback 50 can be supported on the instrument panel 90, the front passenger seat 20 can not only be arranged into the rear seat enter/exit mode but also be made to be held on the instrument panel 90 side in such a state that the front passenger seat 20 is kept arranged into the rear seat enter/exit mode (refer to FIG. 4).

A method (a rearranging method) of arranging the front passenger seat 20 back into the seating mode from the rear seat enter/exit mode will be described. The occupant causes both the eat cushion 30 and the seatback 50 to rise rearward about the pivots at the proximal ends of both the front legs 34 while causing both the front legs 34 of the seat cushion 30 to rise rearward. Then, as was described above with respect to the rearranging method (the returning method) of rearranging the front passenger seat 20 into the seating mode from the table mode, the front passenger seat 20 can be returned to the state in which the seat cushion is locked on the vehicle floor F. In this way, the front passenger seat 20 can not only be rearranged into (returned to) the seating mode but also be held on the vehicle floor F in such a state that the front passenger seat 20 is rearranged into (returned to) the seating mode (refer to FIG. 2).

[To Storage Mode]

Referring to FIGS. 5 and 6, a method of arranging the front passenger seat 20 into the storage mode from the seating mode will be described. Firstly, the occupant operates the lever 56 on the front passenger seat 20 to the second stage, so as to unlock not only the locks by the lock mechanisms 38 but also the lock by the simple reclining mechanism 40. Next, the occupant causes the seatback 50 to fall rearward relative to the seat cushion 30 so that both the rear legs 36 of the seat cushion 36 to be fitted in the left and right cutouts 52 formed on the seatback 50 while causing the both the front legs 34 of the seat cushion 30 to fall forward.

Following this, the occupant causes the seat cushion 30 to turn forward so that the back supporting surface of the seatback 50 and the seating surface of the seating part 32 of the seat cushion 30 fit respectively to the instrument panel 90 and the toe board 90a which is provided below the instrument panel 90 and that the seating part 32 of the seat cushion 30 and the front legs 34 of the seat cushion 30 form a substantially V shape.

When the distal end of the seatback 50 reaches the foot well 98 as the seat cushion 30 turns forward, the occupant causes the seat cushion 30 to turn forward so that both the projections 54 of the seatback 50 are respectively guided by both the first guide grooves 96 on the center console 92 and the panel surface 94. Then, since the round pins 54a of both the projections 54 are pressed against by both the first guide grooves 96, the round pins 54a are caused to shift from the advancing state to the retreating state against the urging forces exerted thereon.

When the occupant causes the seat cushion 30 to fall forward until the back supporting surface of the seatback 50 fits to the instrument panel 90, since the round pins 54a of both the projections 54 reach the corresponding pin catches 96a of the first guide grooves 96, the round pins 54a return from the retreating state to the advancing state by virtue of the urging forces exerted thereon. Namely, the round pins 54a of both the projections 54 fit in the corresponding pin catches 96a of both the first guide grooves 96. By this series of actions, the seatback 50 can be held on the center console 92 and the panel surface 94 so that the back supporting surface of the seatback 50 fits to the instrument panel 90.

In addition, when a rear end of the seat cushion 30 reaches the foot well 98 as the seat cushion 30 is caused to turn forward, the occupant causes the seat cushion 30 to turn forward so that both the quadrangular pins 58 of the seat cushion 30 reach the corresponding engagement holes 110 on the center console 92 and the panel surface 94. Then, since both the quadrangular pins 58 are pressed against by the center console 92 and the panel surface 94, the quadrangular pins 58 are made to shift from an advancing state to a retreating state against urging forces exerted thereon.

Then, when the occupant causes the seat cushion 30 to turn forward until the seating surface of the seating part 32 of the seat cushion 30 fits to the toe board 90*a* provided below the instrument panel 90, since both the quadrangular pins 58 reach the corresponding engagement holes 110, the quadrangular pins 58 return to the advancing state from the retreating state by virtue of the urging forces exerted thereon. Namely, both the quadrangular pins 58 fit in the engagement holes 110, respectively.

At this state, both the quadrangular pins 58 have reached the corresponding engagement holes 110 so that the first corner 58*a* and the second corner 58*b* fit respectively in the first recess 110*a* and the third recess 110*c*. By this action, the seat cushion 30 can be held on the center console 92 and the panel surface 94 so that the seating surface of the seating part of the seat cushion 30 fits to the toe board 90*a* provided below the instrument panel 90 and that the seating part 32 and the front legs 34 of the seat cushion 30 form a substantially V shape.

In addition, both the quadrangular pins 58 are urged towards the rear as described above. Accordingly, the seat cushion 30 can be held on the center console 92 and the panel surface 94 without generating any looseness. In this way, the front passenger seat 20 can not only be arranged into the storage mode but also be held on the instrument panel 90 side in such a state that the front passenger seat 20 is kept arranged in the storage mode.

A method (a rearranging method) of arranging the front passenger seat 20 back into the seating mode from the storage mode will be described. Firstly, operating the lever 56 on the front passenger seat 20 to the first stage, the occupant causes the round pins 54*a* of both the projections 54 to retreat into the interiors of both the projections 54 against the urging forces exerted thereon and causes both the quadrangular pins 58 to retreat into the interior of the seat cushion 30 against the urging forces exerted thereon. Next, causing both the front legs 34 of the seat cushion 30 to rise to the rear, the occupant causes the seatback 50 to turn to the rear about the pivots at the proximal end sides of the front legs 34.

Since the seatback 50 is made to turn relative to the seat cushion 30 when the seatback 50 is caused to so turn, the seatback 50 is made to return to the upright state relative to the seat cushion 30. Then, when the seatback 50 has returned to the upright state, the seatback 50 is allowed to return to the state in which the seatback 50 is locked relative to the seat cushion 30 by the simple reclining mechanism 40. In addition, when the seat cushion 30 is made to turn rearward further, the front passenger seat 20 can be returned to the state in which the seat cushion 30 is locked on to the vehicle floor F in a similar manner to that describe above with respect to the rearranging method (the returning method) of rearranging (returning) the front passenger seat 20 back into (to) the seating mode from the table mode. In this way, the front passenger seat 20 can not only be rearranged into (returned to) the seating mode but also be held on to the vehicle floor F in such a state that the front passenger seat 20 is kept rearranged into the seating mode (refer to FIG. 2).

[To Foot Rest Mode]

Referring to FIGS. 7 and 8, a method of arranging the front passenger seat 20 into the foot rest mode from the seating mode will be described. Firstly, the occupant operates the lever 56 on the front passenger seat 20 to the second stage, so as not only to unlock the locks on the rear legs 36 by the lock mechanisms 38 but also to unlock the lock on the seatback 50 by the simple reclining mechanism 40. Next, while causing both the front legs 34 of the seat cushion 30 to fall forward, the occupant causes the seatback 50 to fall rearward relative to the seat cushion 30 so that both the rear legs 36 of the seat cushion 30 are fitted, respectively, in the left and right cutouts 52 formed on the seatback 50.

Following this, the occupant causes the seat cushion 30 to turn forward with the seatback 50 kept falling rearward so that the back supporting surface of the seatback 50 fits to the instrument panel 90 and that the seating part 32 of the seat cushion 30 and the front legs 34 of the seat cushion 30 form a substantially inverted V shape in contrast to the substantially V shape which is formed when the front passenger seat 20 is arranged into the storage mode.

When the distal end of the seatback 50 reaches the foot well 98 in association with the seat cushion 30 being caused to turn forward, the occupant continues to cause the seat cushion 30 to turn forward so that both the projections 54 of the seatback 50 are allowed to be guided respectively by the first guide grooves 96 which are formed on the center console 92 and the panel surface 94. Then, since the round pins 54*a* of both the projections 54 are pressed against by the first guide grooves 96, the round pins 54*a* are made to shift from the advancing state to the retreating state against the urging forces exerted thereon.

Then, when the seat cushion 30 continues to be caused to turn forward until the back supporting surface of the seatback 50 fits to the instrument panel 90, since the round pins 54*a* of both the projections 54 reach the pin catches 96*a* of both the first guide grooves 96, respectively, in a similar way to that describe above with respect to the method of arranging the front passenger seat into the storage mode from the seating mode, the round pins 54*a* are made to return to the advancing state from the retreating state by virtue of the urging forces exerted thereon. Namely, the round pins 54*a* of both the projections 54 fit in the pin catches 96*a* of both the first guide grooves 96, respectively. By this action, the seatback 50 can be made to be held on the center console 92 and the panel surface 94 in such a manner that the back supporting surface of the seatback 50 fits to the instrument panel 90.

In addition, when the rear end of the seat cushion 30 reaches the foot well 98 in association with the continued forward turn of the seat cushion 30, the occupant continues to cause the seat cushion 30 to turn forward so that both the quadrangular pins 58 of the seat cushion 30 fit in the pin catches 96*a* of both the first guide grooves 96, respectively. By this series of actions, the seatback 50 can be held on the center console 92 and the panel surface 94 in such a manner that the back supporting surface of the seatback 50 fits to the instrument panel 90.

Then, when die seat cushion 30 continues to be caused to turn forward further until the seating surface of the seating part 32 of the seat cushion 30 fits to the toe board 90*a* provided below the instrument panel 90, since both the quadrangular pins 58 reach both the engagement holes 110, respectively, the quadrangular pins 58 are made to return from the retreating state to the advancing state by virtue of the urging forces exerted thereon. Namely, both the quadrangular pins 58 fit in both the engagement holes 110, respectively.

At this state, both the quadrangular pins 58 have reached both the engagement holes 110 in such a manner that the second corners 58*b* and the third corners 58*b* of the quadrangular pins 58 fit, respectively, in the second recesses 110*b* and the fourth recesses 110d of the engagement holes 110. By this action, the seat cushion 30 can be held on the center console 92 and the panel surface 94 in such a manner that the seating part 32 and the front legs 34 thereof form a substantially V shape which confronts the substantially V shape formed by the seating part 32 and the front legs 34 when the front passenger seat 20 is arranged into the aforesaid storage mode.

In addition, as has already been described, both the quadrangular pins 58 are urged towards the rear. Therefore, the seat cushion 30 can be held on the center console 92 and the panel surface 94 without generating any looseness. In this way, the front passenger seat 20 can not only be arranged into the foot rest mode but also be held on the instrument panel 90 in such a state that the front passenger seat 20 is kept arranged into the foot rest mode.

A method (a rearranging method) of rearranging the front passenger seat 20 back into the seating mode from the foot rest mode will be described. Firstly, the occupant operates the lever 56 on the front passenger seat 20 to the first stage. Then, the occupant causes the round pins 54a of both the projections 54 to retreat into the interiors of the projections 54 against the urging forces exerted thereon and also causes both the quadrangular pins 58 to retreat into the interior of the seat cushion against the urging force exerted thereon. Next, while causing both the front legs 34 of the seat cushion 30 to rise rearward, the occupant causes the seatback 50 to turn rearward about the pivots disposed at the proximal end sides of the front legs 34.

Since, when the seatback 50 is caused to turn in that way, the seatback 50 is made to turn relative to the seat cushion, the seatback 50 is made to return to the upright state relative to the seat cushion 30. Then, when the seatback 50 has been returned to the upright state, the seatback 50 is returned to the state in which the seatback 50 is locked on the seat cushion 30 by the simple reclining mechanism 40. Then, when the seat cushion 30 is also made to turn rearward in the same way, the seat cushion 30 can be made to return to the state in which the seat cushion 30 is locked on the vehicle floor F in a similar manner to that describe above with respect to the rearranging method the front passenger seat 20 back into the seating mode from the storage mode. In this way, the front passenger seat 20 can not only be rearranged into the seating mode but also be held on the vehicle floor F in such a state that the front passenger seat 20 is rearranged into the seating mode (refer to FIG. 2).

[To Flat Luggage Compartment Mode]

Referring to FIG. 9, a method of arranging the front passenger seat 20 into the flat luggage compartment mode from the seating mode will be described. Firstly, the occupant operates the lever 56 on the front passenger seat 20 to the second stage. Then, the occupant unlocks the locks on the rear legs 36 by the lock mechanisms 38 and also unlocks the lock on the seatback 50 on the seat cushion 30 by the simple reclining mechanism 40. Next, while causing both the front legs 34 to fall forward, the occupant cases the seatback 50 to fall rearward relative to the seat cushion 30 in such a manner that both the rear legs 36 of the seat cushion 30 fit into the left and right cutouts 52 formed in the seatback 50.

Following this, the occupant causes the seat cushion 30 to turn forward in such a manner that the back supporting surface of the seatback 50 fits to the instrument panel 90 and that the back side of the seating surface of the seating part of the seat cushion 30 becomes substantially horizontal. When the distal end of the seatback 50 reaches the foot well 98 in association with the seat cushion 30 being caused to so turn, the occupant continues to cause the seat cushion 30 to turn forward in such a manner that both the projections 54 on the seatback 50 are made to be guided by both the first guide grooves 96 on the center console 92 and the panel surface 94. Then, since the round pins 54a of both the projections 54 are pressed against by both the first guide grooves 96, the round pins 54a are allowed to shift from the advancing state to the retreating state against the urging forces exerted thereon.

When the seat cushion 30 continues to be caused to turn forward until the back supporting surface of the seatback 50 fits to the instrument panel 90, since the round pins 54a of both the projections 54 reach the pin catches 96a of the first guide grooves 96, respectively, the round pins 54a are made to return from the retreating state to the advancing state by virtue of the urging force exerted thereon. Namely, the round pins 54a of both the projections 54 fit in the pin catches 96a of both the first guide grooves 96. By this action, the seatback 50 can be held on the center console 92 and the panel surface 94 in such a manner that the back supporting surface of the seatback 50 fits to the instrument panel 90.

In addition, when the rear end of the seat cushion 30 reaches the foot well 98 in association with the seat cushion 30 continuing to be caused to turn forward, the occupant still causes the seat cushion 30 to turn forward in such a manner that both the quadrangular pins 58 of the seat cushion 30 are made to reach both the third pin catches 102 on the center console 92 and the panel surface 94, respectively. Then, since both the quadrangular pins 58 are pressed against by the center console 92 and the panel surface 94, both the quadrangular pins 58 are allowed to shift from the advancing state to the retreating state against the urging forces exerted thereon.

Then, when the seat cushion continues to be caused to turn forward until the back side of the seating surface of the seating part 32 of the seat cushion 30 becomes substantially horizontal, since both the quadrangular pins 58 reach both the third pin catches 102, respectively, the quadrangular pins 58 are made to return from the retreating state to the advancing state by virtue of the urging forces exerted thereon. Namely, both the quadrangular pins 58 fit in both the third pin catches 102, respectively. By this action, the seat cushion 30 can be held on the center console 92 and the panel surface 94 in such a manner that the back side of the seating surface of the seating part thereof becomes substantially horizontal. In this way, the front passenger seat 20 can not only be arranged into the flat luggage compartment mode but also be held on the instrument panel 90 side in such a state that the front passenger seat 20 is kept arranged in the flat luggage compartment mode.

A method (a rearranging method) of rearranging the front passenger seat 20 back into the seating mode from the flat luggage compartment mode will be described. Firstly, the occupant operates the lever 56 on the front passenger seat 20, so as not only to cause the round pins 54a of both the projections 54 to retreat into the interiors of both the projections 54 against the urging forces exerted thereon but also to cause the quadrangular pins 58 to retreat into the interior of the seat cushion 30 against the urging force exerted thereon. Next, while causing both the front legs 34 of the seat cushion 30 to rise rearward, the occupant causes the seatback 50 to turn rearward abut the pivots disposed at the proximal end sides of the front legs 34.

Since the seatback 50 is made to turn relative to the seat cushion 30 when the seatback 50 is caused to turn rearward in that way, the seatback 50 is made to return to the upright state relative to the seat cushion 30. Then, when the seatback 50 has been returned to the upright state, the seatback 50 is returned to the state in which the seatback 50 is locked on the seat cushion 30 by the simple reclining mechanism 40. In addition, when the seat cushion 30 is then caused to turn rearward, the seat cushion 30 can be made to return to the state in which the seat cushion 30 is locked on the vehicle floor F in a similar manner to that described above with respect to the rearranging method of the front passenger seat 20 back into seating mode from the table mode. In this way, the front passenger seat 20 can not only be rearranged into the seating mode but also be held on the vehicle floor F in such a state that the front passenger seat 20 is rearranged into the seating mode (refer to FIG. 2).

[To Rearward Facing Child Safety Seat Mode]

Lastly, referring to FIG. 10, a method of arranging the front passenger seat 20 into the rearward facing child safety seat mode form the seating mode will be described. Firstly, the occupant operates the lever 56 on the front passenger seat 20 to the second stage, so as not only to unlock the locks on the rear legs 36 by the lock mechanisms 38 but also to unlock the lock on the seatback 50 by the simple reclining mechanism 40. Next, while causing both the front legs 34 of the seat cushion 30 to fall rearward, the occupant causes the seatback 50 to fall rearward relative to the seat cushion 30 in such a manner that both the rear legs 36 of the seat cushion 30 are fitted in the left and right cutouts 52 formed on the seatback 50, respectively.

Following this, the occupant causes the seat cushion 30 to turn forward in such a manner that the back side of the seating surface of the seating part 32 of the seat cushion 30 becomes substantially horizontal and that the seatback 50 takes the upright posture relative to the seat cushion 30. When the distal end of the seatback 50 reaches the foot well 98 in association with the seat cushion 30 being caused to turn forward, the occupant causes the seat cushion 30 to turn forward in such a manner that both the projections 54 on the seatback 50 are guided by both the first grooves 96 on the center console 92 and the panel surface 94, respectively. Then, since the round pins 54 of both the projections 54 are pressed against by both the first guide grooves 96, the round pins 54a are allowed to shift from the advancing state to the retreating state against the urging forces exerted thereon.

Then, when the seat cushion 30 continues to be caused to turn forward until the back supporting surface of the seatback 50 fits to the instrument panel 90, since the round pins 54a of both the projections 54 reach the pin catches 96a of both the first guide grooves 96, respectively, the round pins 54a are made to return from the retreating state to the advancing state by virtue of the urging forces exerted thereon. Namely, the round pins 54a of both the projections 54 fit in the pin catches 96a of both the first guide grooves 96, respectively. By this action, the seatback 50 can be held on the center console 92 and the panel surface 94 in such a manner that the seatback 50 takes the upright posture relative to the seat cushion 30.

In addition, when the rear end of the seat cushion 30 reaches the foot well 98 in association with the seat cushion 30 continuing to be caused to turn forward, the occupant causes the seat cushion 30 to turn forward further in such a manner that both the quadrangular pins 58 are made to reach both the fourth pin catches 104 on the center console 92 and the panel surface 94, respectively. Then, since both the quadrangular pins 58 are pressed against by the center console 92 and the panel surface 94, both the quadrangular pins 58 are allowed to shift from the advancing state to the retreating state against the urging forces exerted thereon.

Then, when the seat cushion 30 continues to be caused to turn forward until the back side of the seating surface of the seating part 32 of the seat cushion 30 becomes substantially horizontal, since both the quadrangular pins 58 reach both the fourth pin catches 104, respectively, both the quadrangular pins 58 are made to return from the retreating state to the advancing state by virtue of the urging forces exerted thereon. Namely, both the quadrangular pins 58 fit in both the fourth pin catches 104, respectively. By this action, the seat cushion 30 can be held on the center console 92 and the panel surface 94 in such a manner that the back side of the seating surface of the seating part of the seat cushion 30 takes a substantially horizontal posture. In this way, the front passenger seat 20 can not only be arranged into the rearward facing child safety seat mode but also be held on the instrument panel 90 side in such a state that the front passenger seat is kept arranged into the rearward facing child safety seat mode.

A rearranging method of rearranging the front passenger seat 20 back into the seating mode from the rearward facing child safety seat mode will be described. Firstly, the occupant operates the lever 56 on the front passenger seat 20 to the first stage. Then, the occupant not only causes the round pins 54a of both the projections 54 to retreat into the interiors of the projections 54 against the urging forces exerted thereon but also causes the both quadrangular pins 58 to retreat into the interior of the seat cushion 30 against the urging forces exerted thereon. Next, while causing both the front legs 34 of the seat cushion 30 to rise rearward, the occupant causes the seatback 50 to turn rearward about the pivots disposed at the proximal end sides of the front legs 34.

When the seatback 50 is caused to turn in that way, since the seatback 50 is made to turn relative to the seat cushion 30, the seatback 50 is made to return to the state in which the seatback 50 becomes upright relative to the seat cushion 30. Then, when the seatback 50 has been returned to the upright state, the seatback 50 is returned to the state in which the seatback 50 is locked on the seat cushion by the simple reclining mechanism 40. In addition, when the seat cushion 30 is then caused to turn rearward, the seat cushion 30 can be made to return to the state in which the seat cushion 30 is locked on the vehicle floor F in a similar manner to that described above with respect to the rearranging method of rearranging the front passenger seat 20 back into the seating mode from the table mode. In this way, the front passenger seat can not only be rearranged into the seating mode but also be made to be held on the vehicle floor F in such a state that the front passenger seat 20 is kept rearranged into the seating mode (refer to FIG. 2).

The front passenger seat 20 according to the embodiment of the present invention is configured as described above. According to the configuration thereof, the front passenger seat 20 is made up of the seat cushion made up of the seating part 32, the pair of left and right front legs 34, 34, and the pair of left and right rear legs 36, 36 and the seatback 50. Therefore, the front passenger seat 20 has the simple configuration. In addition, the front passenger seat 20 can be arranged from the seating mode into at least three modes of the modes including the table mode, the rear seat enter/exit mode, the storage mode, the foot rest mode, the flat luggage compartment mode and the rearward facing child safety seat mode. Of course, the arrangement of the front passenger seat 20 is not limited to the three modes, and hence, the front passenger seat 20 can be arranged into all the modes. Consequently, even though the front passenger seat 20 has the simple configuration, the usefulness thereof can be enhanced.

While the present invention has been shown and described with reference to certain exemplary embodiments thereof, it will be understood by those skilled in the art that various changes in form and details may be made therein without departing from the spirit and scope of the invention as defined by the appended claims.

In the embodiment, as the configuration in which the seatback 50 is held on the instrument panel 90 side, the configuration has been described in which the left and right round pins 54a which are formed on the seatback 50 fit the first pin catches 96a or the second pin catches 100a, respectively, which are formed on both the left wall surface of the center console 92 and the panel surface 94 which faces the front passenger seat side door so that the seatback 50 is held on the instrument panel 90 side. However, the present invention is not limited to the example configuration, and hence, for example, a configuration may be adopted in which a hooking member (for example, a hook or the like) is provided on the instrument panel 90 so that the seatback 50 is hooked on the hooking member so as to be held on the instrument panel 90 side.

What is claimed is:

1. A vehicle seat comprising:
   a seat cushion comprising:
      a seating part which configures an occupant seating portion;
      a front leg which is rotatably attached to the seating part at a front side of the seating part to support the seating part; and
      a pair of left and right rear legs which support a rear side of the seating part; and
   a seatback which is provided to the rear side of the seat cushion so as to be capable of falling rearward,
   wherein:
   the front leg is rotatably attached to a vehicle floor at a distal end thereof,
   the pair of left and right rear legs are detachably attached to the vehicle floor at distal ends thereof,
   the vehicle seat is adapted to be arranged from a seating mode in which the seatback is locked in an upright state relative to the seat cushion and both of the distal ends of the rear legs are locked relative to the vehicle floor, into at least three of a plurality of modes comprising:
   a table mode, in which
      the seatback is fell forward together with the seat cushion about a pivot at a proximal end of the front leg until a back side of the seatback becomes substantially horizontal while the front leg of the seat cushion falling rearward by unlocking the lock on the rear legs among the lock on the seatback and the lock on the rear legs, and
      the seatback is held on an instrument panel side in such a state that the seatback is kept falling forward;
   a rear seat enter/exit mode, in which:
      the seatback is fell forward together with the seat cushion about the pivot at the proximal end of the front leg until the seatback comes to take a forwardly tilting posture while the front leg of the seat cushion falling forward by unlocking the lock on the rear legs among the lock on the seatback and the lock on the rear legs, and
      the seatback is held on the instrument panel side in such a state that the seatback is kept falling forward;
   a storage mode, in which:
      the seatback is fell rearward relative to the seat cushion while the front leg of the seat cushion falling forward by unlocking both of the lock on the seatback and the lock on the rear legs,
      the seat cushion is turned forward with the seatback kept falling rearward so that a back supporting surface of the seatback and a seating surface of the seating part of the seat cushion fit, respectively, to the instrument panel and a toe board provided below the instrument panel and that the seating part of the seat cushion and the front leg of the seat cushion form a substantially V shape, and
      the seat cushion and the seatback are held on the instrument panel side in such a state that the seat cushion is kept turning forward;
   a foot rest mode in which:
      the seatback is fell rearward relative to the seat cushion while the front leg of the seat cushion falling forward by unlocking both of the lock on the seatback and the lock on the rear legs,
      the seat cushion is turned forward with the seatback kept falling rearward so that the back supporting surface of the seatback fits to the instrument panel and that the seating part of the seat cushion and the front leg of the seat cushion form a substantially inverted V shape in contrast to the substantially V shape formed in the storage mode, and
      the seat cushion and the seatback are held on the instrument side in such a state that the seat cushion is kept turning forward;
   a flat luggage compartment mode, in which:
      the seatback is fell rearward relative to the seat cushion while the front leg of the seat cushion falling forward by unlocking both the lock on the seatback and the lock on the rear legs,
      the seat cushion is turned forward with the seatback kept falling rearward so that the back supporting surface of the seatback fits to the instrument panel and that a back side of the seating surface of the seating part of the seat cushion becomes substantially horizontal, and
      the seat cushion and the seatback are held on the instrument panel side in such a state that the seat cushion is kept turning forward; and
   a rearward facing child safety seat mode, in which:
      the seatback is fell rearward relative to the seat cushion while the front leg of the seat cushion falling rearward by unlocking both of the lock on the seatback and the lock on the rear legs,
      the seat cushion is turned forward with the seatback kept falling rearward so that the back side of the seating surface of the seating part of the seat cushion becomes substantially horizontal and that the seatback is put in an upright state relative to the seat cushion, and
      the seat cushion and the seatback are held on the instrument panel side in such a state that the seat cushion is kept turning forward.

2. The vehicle seat according to claim 1,
   wherein the front leg is provided with a stopper which interfere with the seating part so as to regulate that the front leg falls forward or rearward in the seating mode.

3. The vehicle seat according to claim 1,
   wherein each of the rear legs is formed with a hook engageable with a striker which is provided in a recess portion formed in the vehicle floor so that the rear legs are locked on the vehicle floor.

4. The vehicle seat according to claim 1,
   wherein the seatback is formed with projections at left and right sides thereof, which are respectively guided by grooves formed on a vehicle when the vehicle seat is arranged from the seating mode to the table mode, the storage mode, the foot rest mode, the flat luggage compartment mode, or the rearward facing child safety seat mode.

5. The vehicle seat according to claim 4,
   wherein the grooves comprise first grooves and second grooves,
   wherein the projections of the seatback are respectively guided by the first grooves when the vehicle seat is arranged from the seating mode to the storage mode, the foot rest mode, the flat luggage compartment mode, or the rearward facing child safety seat mode, and wherein the projections of the seatback are respectively guided by the second grooves when the vehicle seat is arranged from the seating mode to the table mode.

6. The vehicle seat according to claim 4, wherein each of the projection is provide with a pin so as to advance and retreat relative to a surface of the corresponding projection, and wherein the pins retreat during the projections being guided by the grooves, and advance at pin catches provided at ends of the grooves in the table mode, the storage mode, the foot rest mode, the flat luggage compartment mode, or the rearward facing child safety seat mode.

7. The vehicle seat according to claim 1, wherein the seatback is provided with a lever which is operable in two stage, and wherein when the lever is operated in a first stage, the lock on the rear legs is unlocked, and when the lever is operated in a second stage, the lock on the seatback is unlocked.

8. The vehicle seat according to claim 1, wherein the front leg includes a pair of right and left legs rotatably attached to the seating part at left and right portion of the front side of the seating part.

9. The vehicle seat according to claim 1, wherein the seat cushion and the seatback are smaller than those of a driver seat, respectively.

10. A vehicle seat comprising:

a seat cushion comprising:
  a seating part which configures an occupant seating portion;
  a pair of left and right front legs which are rotatably attached to the seating part at a front side of the seating part to support the seating part; and
  a pair of left and right rear legs which support a rear side of the seating part; and a seatback which is provided to the rear side of the seat cushion so as to be capable of falling rearward, wherein:

the pair of left and right front legs are rotatably attached to a vehicle floor at distal ends thereof, the pair of left and right rear legs are detachably attached to the vehicle floor at distal ends thereof, the vehicle seat is adapted to be arranged from a seating mode in which the seatback is locked in an upright state relative to the seat cushion and both of the distal ends of the rear legs are locked relative to the vehicle floor, into a plurality of modes comprising:

a table mode, in which
  the seatback is fell forward together with the seat cushion about a pivot at proximal ends of the front legs until a back side of the seatback becomes substantially horizontal while the front legs of the seat cushion falling rearward by unlocking the lock on the rear legs among the lock on the seatback and the lock on the rear legs, and
  the seatback is held on an instrument panel side in such a state that the seatback is kept falling forward;

a rear seat enter/exit mode, in which:
  the seatback is fell forward together with the seat cushion about the pivot at the proximal ends of the front legs until the seatback comes to take a forwardly tilting posture while the front legs of the seat cushion falling forward by unlocking the lock on the rear legs among the lock on the seatback and the lock on the rear legs, and
  the seatback is held on the instrument panel side in such a state that the seatback is kept falling forward;

a storage mode, in which:
  the seatback is fell rearward relative to the seat cushion while the front legs of the seat cushion falling forward by unlocking both of the lock on the seatback and the lock on the rear legs,
  the seat cushion is turned forward with the seatback kept falling rearward so that a back supporting surface of the seatback and a seating surface of the seating part of the seat cushion fit, respectively, to the instrument panel and a toe board provided below the instrument panel and that the seating part of the seat cushion and the front legs of the seat cushion form a substantially V shape, and
  the seat cushion and the seatback are held on the instrument panel side in such a state that the seat cushion is kept turning forward;

a foot rest mode in which:
  the seatback is fell rearward relative to the seat cushion while the front legs of the seat cushion falling forward by unlocking both of the lock on the seatback and the lock on the rear legs,
  the seat cushion is turned forward with the seatback kept falling rearward so that the back supporting surface of the seatback fits to the instrument panel and that the seating part of the seat cushion and the front legs of the seat cushion form a substantially inverted V shape in contrast to the substantially V shape formed in the storage mode, and
  the seat cushion and the seatback are held on the instrument side in such a state that the seat cushion is kept turning forward;

a flat luggage compartment mode, in which:
  the seatback is fell rearward relative to the seat cushion while the front legs of the seat cushion falling forward by unlocking both the lock on the seatback and the lock on the rear legs,
  the seat cushion is turned forward with the seatback kept falling rearward so that the back supporting surface of the seatback fits to the instrument panel and that a back side of the seating surface of the seating part of the seat cushion becomes substantially horizontal, and
  the seat cushion and the seatback are held on the instrument panel side in such a state that the seat cushion is kept turning forward; and a rearward facing child safety seat mode, in which:
  the seatback is fell rearward relative to the seat cushion while the front legs of the seat cushion falling rearward by unlocking both of the lock on the seatback and the lock on the rear legs,
  the seat cushion is turned forward with the seatback kept falling rearward so that the back side of the seating surface of the seating part of the seat cushion becomes substantially horizontal and that the seatback is put in an upright state relative to the seat cushion, and
  the seat cushion and the seatback are held on the instrument panel side in such a state that the seat cushion is kept turning forward.

\* \* \* \* \*